United States Patent [19]
Lovett

[11] 4,013,269
[45] Mar. 22, 1977

[54] WIREGUIDE-TRANSPORT APPARATUS

[76] Inventor: Jack R. Lovett, 1900 Irwing, Orange, Tex. 77360

[22] Filed: Dec. 19, 1975

[21] Appl. No.: 642,580

[52] U.S. Cl. .................................. 254/134.3 PA
[51] Int. Cl.² ..................................... B65H 59/00
[58] Field of Search ........... 254/134.3 PA, 134.3 R, 254/195, 196

[56] References Cited
UNITED STATES PATENTS

| | | | |
|---|---|---|---|
| 1,235,999 | 8/1917 | Neeley | 254/134.3 PA |
| 2,786,092 | 3/1957 | Gage | 254/134.3 PA |
| 3,918,685 | 11/1975 | Lindsey et al. | 254/134.3 PA |

Primary Examiner—Al Lawrence Smith
Assistant Examiner—Robert C. Watson
Attorney, Agent, or Firm—Pravel, Wilson & Gambrell

[57] ABSTRACT

A temporary guide support adapted to be removably connected to a high top insulator for guiding and transporting a wire or high voltage electrical line while it is being strung in place on its insulators. After the line is positioned on the insulators, the guide is removed and the line permanently connected to the insulators.

5 Claims, 5 Drawing Figures

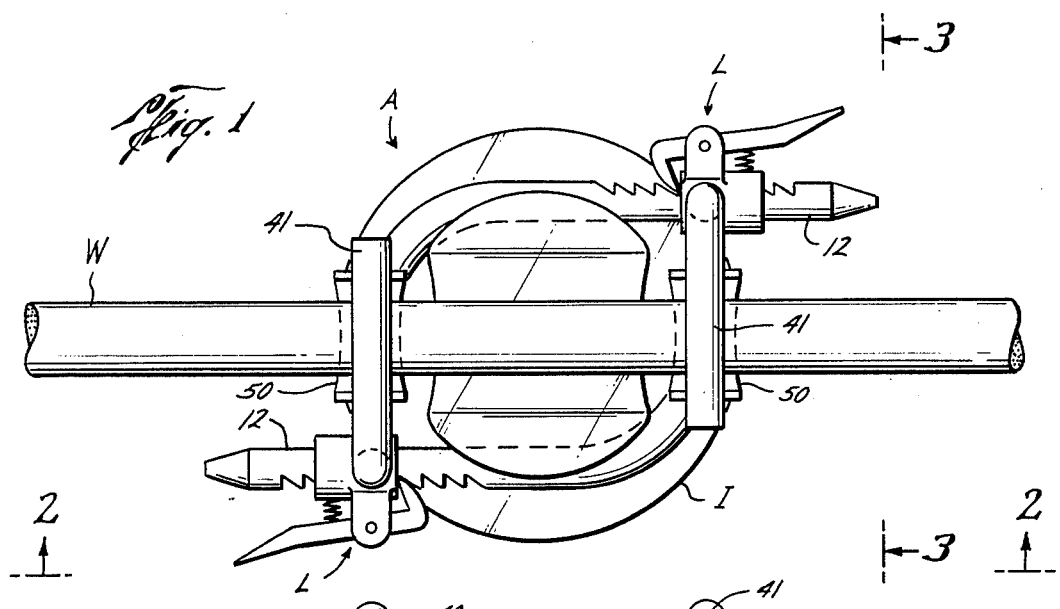
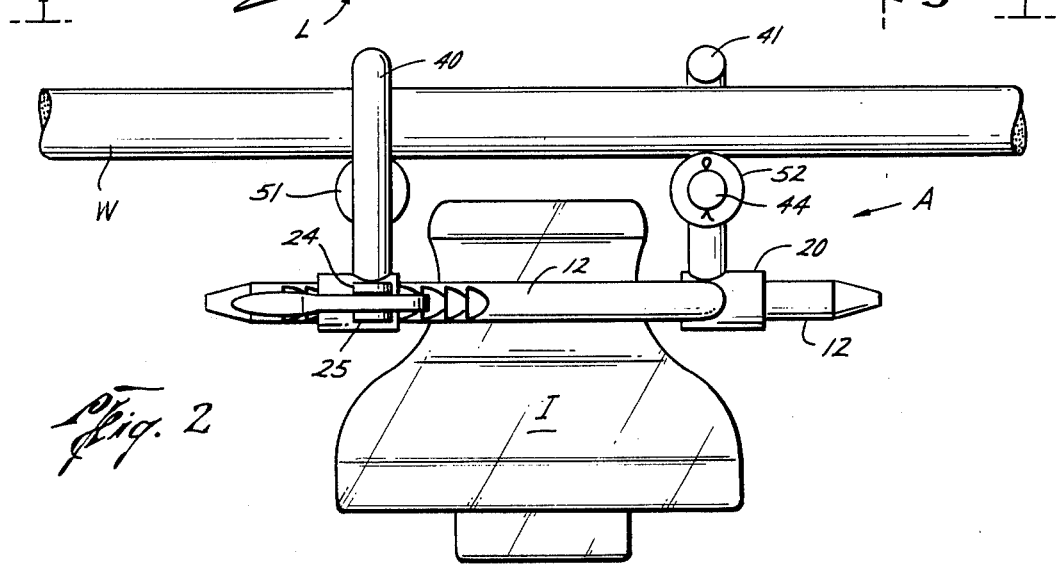
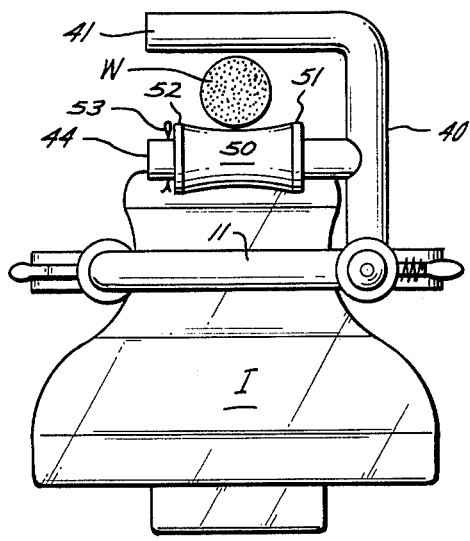

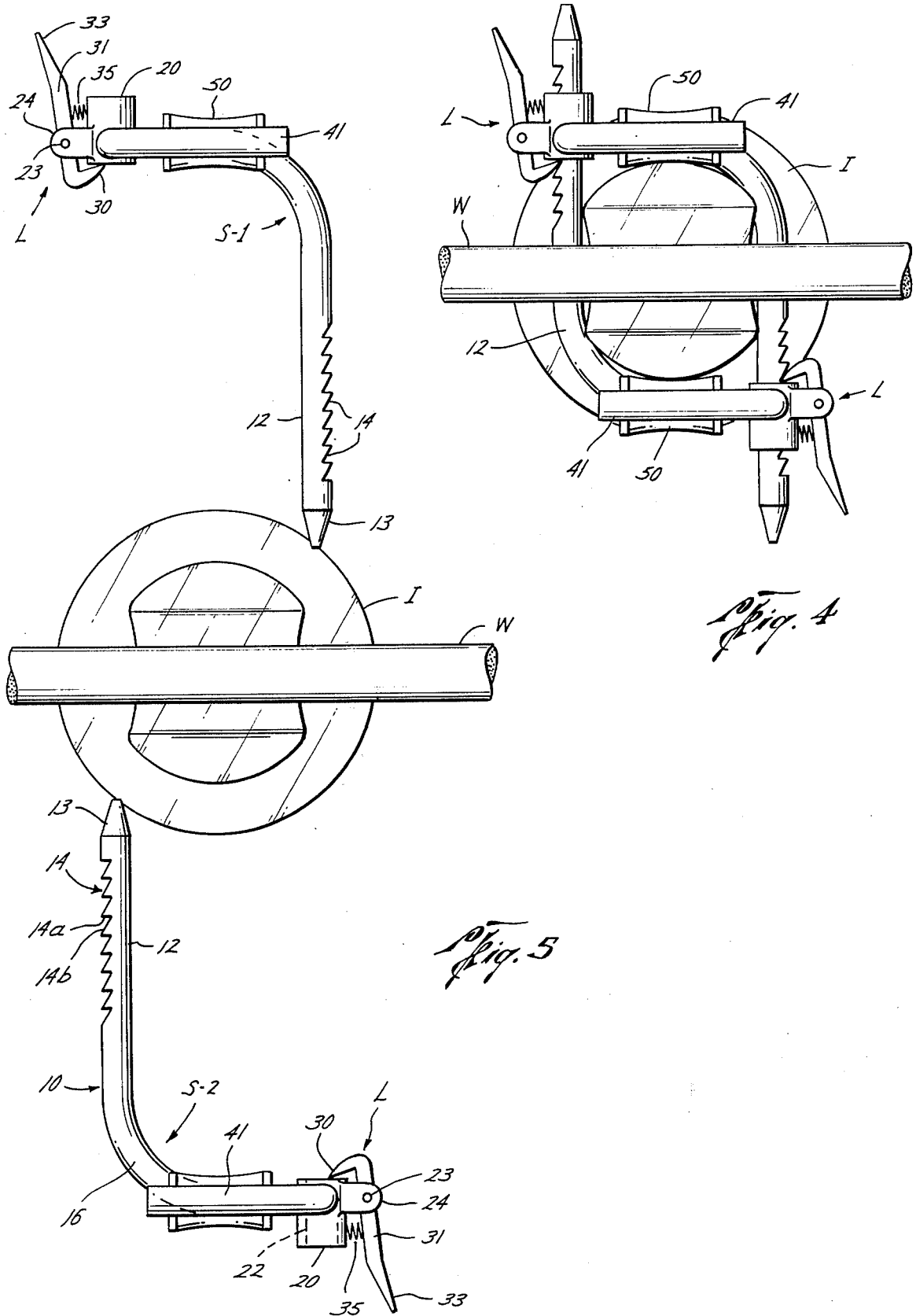

WIREGUIDE-TRANSPORT APPARATUS

BACKGROUND OF THE INVENTION

In the past, when high voltage transmission lines have been removed prior to replacement or the installation of higher capacity lines, the old lines were de-energized and removed from the tower insulators and pulley blocks set up at each insulator to contain the new wire as it was pulled in a rope or the old wire. This practice required erecting a series of pulley blocks to guide the wire as it was pulled into place and required frequent trips up and down the towers by workmen in order to install the new wire in place.

SUMMARY OF THE INVENTION

The present invention provides a new and improved wireguide and transport line adapted to be positioned on high top insulators for guiding a high voltage line as it is pulled into place on the insulators. Further, with the present invention, the new wire may be attached to the end of a length of the old wire and as the old wire is pulled off of the insulators, the new wire is pulled into place by the old wire.

The guide and transport comprises a pair of opposed open-sided guide members adapted to be releasably latched together on an insulator to provide a low-friction roller and guide means for supporting and guiding the old wire as it is removed and the new wire as it is pulled into position on the insulators.

BRIEF DESCRIPTION OF THE DRAWINGS

FIG. 1 is a top view showing the guide transport positioned on an insulator and supporting the wire;

FIG. 2 is a side view of the guide transport means shown in FIG. 1;

FIG. 3 is an endview of the guide transport means of FIGS. 1 and 2;

FIG. 4 shows the guide transport means rotated 90° from the position shown in FIG. 1 and out of a supporting position of the wire; and FIG. 5 shows the guide transport segments disconnected from each other and removed from the insulator.

DESCRIPTION OF THE PREFERRED EMBODIMENT

Considering now the apparatus of the present invention in more detail, the guide transport apparatus is designated generally A in the drawings. The insulator is I and the high voltage line or wire is marked W. The guide transport A comprises a pair of segments S-1 and S-2, respectively, which are substantially identical to each other.

To facilitate the description of these segments S-1 and S-2, attention is drawn to FIG. 5 where they are shown drawn apart from one another and the insulator I, yet nevertheless, aligned with another as will be described shortly.

First, it should be noted that segment S-1 has a L-shaped base member, designated generally 10, including a short leg 11 (FIG. 3) and a long leg 12. The long leg 12 has a tapered end 13 and a plurality of spaced transverse notches 14 arranged at spaced intervals along the long leg 12 for receiving a latch member L mounted on the other segment S-2 and for providing a means for adjusting the size of the apparatus A to fit different size insulators.

A curved portion designated 16 is provided between the short leg 11 and the long leg 12 for fitting around the neck N of the high top insulator I when the segments S-1 and S-2 are drawn together as will be described herein.

As best seen in FIGS. 2 and 3, the segment S-1 also has a tubular housing 20 affixed to the end of the short leg 11. Such tubular housing 20 is welded or otherwise secured to the end of the short leg 11 and is disposed with the bore 22 of the tubular housing aligned substantially parallel with the axis of the long leg 12. This bore is provided for receiving the long leg 12 of the segment S-2 when the segments S-1 and S-2 are connected together (FIG. 1) as will be described. Also, the tubular housing 20 has a latch member L pivotally mounted thereon on pin 23 carried by a pair of spaced ears 24 and 25. Such latch member includes a tapered point 30 formed at the end of a shank 31. Such shank has a hole through which pin 23 passes. Further, the shank has a flattened finger or thumb depressing portion 33 at the end opposite the point 30 to facilitate manually pivoting the latch member to withdraw the point 30 from one of the notches 14 in the long leg 12.

As shown, the notches have one side 14a which is substantially perpendicular to the axis of the long leg 12 and another side 14b which is tapered or inclined in substantially the same angle as the tapered end 13 of the long leg 12. Further, a spring 35 is provided for urging the tip or end 30 of the latch into the notch 14. Manually depressing the thumb or finger depressor 33 will compress the spring 35 and permit the tip 30 to be withdrawn from the notch 14 when desired.

Also, as shown in FIGS. 2 and 3, an upwardly extending guide member 40 is provided which projects vertically upwardly from the tubular housing 20 at substantially a right angle with respect to the axis of the bore 22. Such upwardly extending guide member terminates with a horizontal finger or guide member 41 which projects laterally substantially parallel to the short leg 11. A second intermediate finger 44 is provided between the short leg 11 and the finger guide 41. The intermediate finger 44 is substantially parallel to the short leg 11 and has a roller 50 rotatably mounted thereon. The roller 50 is disposed between circular washers 51 and 52 and a pin or cotter key 53 is provided for holding the roller 50 in place on the shaft 44.

As stated earlier, the segment S-2 is substantially identical to the segment S-1 and, therefore, like numbers or letters will be used to identify like parts in the drawings.

It will be appreciated that the wire W is normally lashed in place on top of the insulator I by wire seizing or the like. However, to remove a wire W from the insulator I, the lashing is removed and the segments S-1 and S-2 are coupled together in position on the neck portion N of insulator I beneath the wire W. To couple the segments S-1 and S-2, they are aligned in facing relationship much as shown in FIG. 5 with the tapered end 13 of the long leg 12 aligned with the bore 22 of the opposite segment. With the latch means L depressed so as to withdraw the tip portion 30 from the bore opening, the long legs 12 are inserted into the bores 22 and the segments S-1 and S-2 are moved toward one another until the curved portion 16 engages the neck N of the insulator I. Thereafter, the wire W is lifted off of the insulator I and the segments S-1 and S-2 are rotated 90° to position the rollers 50 beneath the wire W. Whereupon, the wire W is lowered onto the rollers 50. In this position (FIGS. 1–3) the wire W is supported on the rollers 50 on either side of the top of the insulator I and the wire W is constrained against lateral movement by the vertical members 40 on opposite sides of the wire W. Further, the wire W is constrained against upward movement by the horizontal finger guides 41 positioned above the wire W. However, it will be appreciated that the wire W is free to move axially through the guide transport apparatus of this invention on the low friction rollers 50.

By placing the guide transport apparatus on a number of adjacent high line insulators, a substantial length of wire or cable may be removed and a new length of cable of the same or different size may be attached to one end of the existing cable and strung in place on the insulators I as the old or previously existing cable is withdrawn. With this invention, a new length of cable may be substituted for an old length of cable merely by placing the existing cable in the wire guide transports of this invention and pulling the old cable out and the new cable in place and, of course, the new cable may be attached to the end of the old cable so that the new cable is strung in place as the old cable is being removed.

Once the new cable is in place, the cable may be lifted slightly to free or unload the guide transport rollers and the guide transport is then rotated 90° and the cable then lowered onto the top of the insulator I. Thereafter, the guide transport may be removed from the insulators by depressing the latches L and drawing the segments S-1 and S-2 apart. The wire then may be latched to the insulators in the usual manner.

It will be understood that the guide transport devices of the present invention can be attached to the insulators I while the wire W is energized with the electric current and does not require that the wire W be de-energized while the devices are being set up on the insulators.

The foregoing disclosure and description of the invention are illustrative and explanatory thereof, and various changes in the size, shape and materials as well as in the details of the illustrated construction may be made without departing from the spirit of the invention.

What is claimed is:

1. An apparatus for supporting and guiding a wire cable as it is pulled axially into position atop a high top insulator, comprising:
    a. a removable support means adapted to be affixed to a high top insulator, said removable support means including a pair of interfitting L-shaped segments each having a long leg and a short leg disposed at approximately 90° with respect to one another and having a bore formed at the end of the short leg for receiving the end of the long leg of the other segment in latch means for latching the long leg in said bore;
    b. roller means carried on said support means and extending transversely with respect to the longitudinal axis of the cable for engaging and supporting said cable as it is moved axially into position on an insulator.

2. The invention of claim 1, wherein said guide means includes a pair of spaced guide members extending vertically upwardly from said support means and adapted to be disposed on opposite sides of the insulator when the removable support means is affixed to the insulator.

3. The invention of claim 2, wherein said spaced guide members include upper guide means which are positioned at the upper end of said vertical guide members and which are disposed at substantially 90° which respect thereto.

4. The invention of claim 2, wherein said spaced guide members include horizontally disposed roller means positioned below said upper guide members.

5. The invention of claim 1 wherein said removable support means includes a vertical guide member extending upwardly from said L-shaped segments with an upper guide member at the top of said vertical guide member disposed at substantially 90° relative thereto and with roller means below said vertical guide member for carrying a cable when moved axially.

* * * * *